455-619 AU 233 EX
FIP8106 OR 3,215,840

EXAMINER
230

INVENTOR.
CARL F. BUHRER
BY
R. J. Frank
ATTORNEY

INVENTOR.
CARL F. BUHRER
BY
R. J. Frank
ATTORNEY

Nov. 2, 1965 C. F. BUHRER 3,215,840

IMAGE REJECTING OPTICAL SUPERHETERODYNE RECEIVER

Filed Nov. 23, 1962 3 Sheets-Sheet 3

INVENTOR.
CARL F. BUHRER

BY R. J. Frank

ATTORNEY

1

3,215,840

IMAGE REJECTING OPTICAL SUPER-HETERODYNE RECEIVER

Carl F. Buhrer, Hempstead, N.Y., assignor to General Telephone and Electronics Laboratories, Inc., a corporation of Delaware Filed Nov. 23, 1962, Ser. No. 239,438
13 Claims. (Cl. 250—199)

This invention relates to optical receivers and in particular to an optical superheterodyne system for receiving single-sideband light signals.

As is well known, an electromagnetic carrier amplitude-modulated by an information bearing signal may be thought of as consisting of a first signal component varying sinusoidally at the carrier frequency, an upper sideband component varying sinusoidally at the sum of the carrier and modulation frequencies and a lower sideband component varying sinusoidally at the difference between the carrier and modulation frequencies. Each sideband, considered separately, contains all of the information present in the modulated wave, and therefore it is possible to convey the total information represented by modulating signal by transmitting only a single sideband. Furthermore, the carrier need not be transmitted since it contains none of the intelligence represented by the modulation.

In my copending application Serial No. 196,357, filed February 9, 1962 and in the copending application Serial No. 206,982, filed July 2, 1962 by Donald H. Baird et al., apparatus is described for producing single-sideband modulation of a light beam. By means of this apparatus, a single sideband signal can be transmitted with or without suppression of the carrier. It is also possible to transmit two independent signals, one signal having a sideband frequency above the carrier frequency and the other below.

Light signals of this type can be detected by a superheterodyne receiver in which the input light beam is mixed in a photocell with a coherent local light oscillator beam operating at the carrier frequency. The output of the photocell has an intermediate frequency or frequencies equal to the difference between each of the sideband frequencies present in the input light signal and the frequency of the local oscillator. This simple superheterodyne receiving system preserves the frequency and amplitude variations in the input beam and has a relatively high signal-to-noise ratio. However, the described system will not reject a spurious signal, known as an image signal, which is separated from the carrier frequency by the modulation frequency and is on the opposite side of the carrier frequency. In addition, if two signals having frequencies above and below the carrier respectively are received simultaneously, they cannot be separated.

For the purpose of this disclosure, an upper sideband is defined as a signal having an angular frequency greater than the carrier frequency $w_c$ by an amount $p$ and a lower sideband is defined as a signal having an angular frequency less than the carrier frequency by an amount $q$, where $p$ and $q$ are the angular frequencies of first and second modulation signals, and $p$ may differ from $q$. A spurious signal having an angular frequency $w_c-p$ received simultaneously with the desired upper sideband signal $w_c+p$ is called an upper sideband image signal and a spurious signal having a frequency $w_c+q$ received at the same time as the desired lower sideband signal $w_c-q$ is called a lower sideband image signal. Also, although the modulation frequencies $q$ and $p$ are single frequencies, the received signal may have a complex waveform consisting of a summation of Fourier components, where $p$ and $q$ represent any of the frequencies present in the complex wave.

2

Accordingly it is an object of my invention to provide an optical superheterodyne receiver capable of rejecting an image frequency.

It is another object of my invention to provide an optical receiver suitable for receiving single-sideband modulated light signals.

Still another object is to provide an optical receiver capable of simultaneously receiving and separating upper and lower sideband light signals.

Yet another object is to provide an optical receiver having a high signal-to-noise ratio.

In the present invention, an optical receiver is provided which converts a single-sideband light signal into an electrical signal at the modulation frequency while rejecting the image signal. Further, the receiver is capable of simultaneously receiving independent upper and lower sideband signals, separating them, and producing first and second output signals. One of these output signals has an angular modulation frequency $p$ equal to the difference between the upper sideband frequency and the carrier, and the other an angular modulation frequency $q$ equal to the difference between the carrier and the lower sideband frequency.

In accordance with the invention, the input signal is combined with a coherent local light oscillator signal operating at the carrier frequency to form first and second composite light signals. Each of the composite light signals have first and second components which correspond to the input and local oscillator signals. Phase shifting means are provided to produce an instantaneous angular phase difference (in time) between the first and second components of the first composite signal which differs by 90° from the instantaneous angular phase difference between the first and second components of the second composite signal. The first and second components of the first composite signal are mixed in photodetector means to produce a signal having an intermediate frequency or frequencies equal to the difference between the sideband frequency or frequencies and the oscillator frequency. Similarly, the first and second components of the second composite signal are mixed in photodetector means to produce a signal at the intermediate frequency or frequencies. Means are also provided for shifting the relative phase of the first and second composite signals by 90° at the intermediate frequencies either before or after detection.

The input and local oscillator light beams are polarized before being combined in a beam splitting device to form the first and second composite signals. Both the input and oscillator beams may be plane polarized, one may be plane polarized and the other circularly polarized or both may be circularly polarized. The 90° instantaneous phase difference between the components of the first and second composite beams is obtained by placing a quarter-wave plate (i.e. an optical birefringent plate having a quarter-wave phase shift at the carrier frequency) in either the input or oscillator beams or in either of the two comopsite beams.

The photodetector means may consist of a single photocell arranged so that the first and second composite beams impinge on the active surface of the photocell at two separated points. The 90° phase shift at the intermediate frequency is obtained by making the distances traversed by the composite beams differ such that the intervals of time required for the two beams to travel between the beam splitter and the photocell differ by one-quarter cycle of the modulation frequency. In this embodiment a single output signal having a frequency equal to the difference between one of the sideband frequencies and the local oscillator frequency is obtained from the photocell. The output signal will have a frequency equal to either the upper or lower sideband frequency depending upon the construction of the receiver.

In another embodiment of my invention, first and second photocells are illuminated by the first and second composite signals. The 90° phase shift at the intermediate frequency may be obtained by making the light path followed by one of the composite beams longer than the other, as described above, or by shifting the phase of the output of one of the photocells by 90° with respect to that of the other photocell. The outputs of the two photocells are added in a summing circuit having first and second output terminals. If only the upper sideband has been transmitted on the input light beam, the voltage at the first output terminal will have an angular frequency $p$, the voltage at the second output terminal being zero. Conversely, if only the lower sideband is received, the voltage at the second output terminal will have an angular frequency $q$ and the output at the first terminal will be zero. If both upper and lower sidebands are transmitted simultaneously, the modulation frequencies $p$ and $q$ will appear at the first and second output terminals respectively.

The above objects of and the brief introduction to the present invention will be more fully understood and further objects and advantages will become apparent from a study of the following description in connection with the drawings, wherein.

Figure 1:
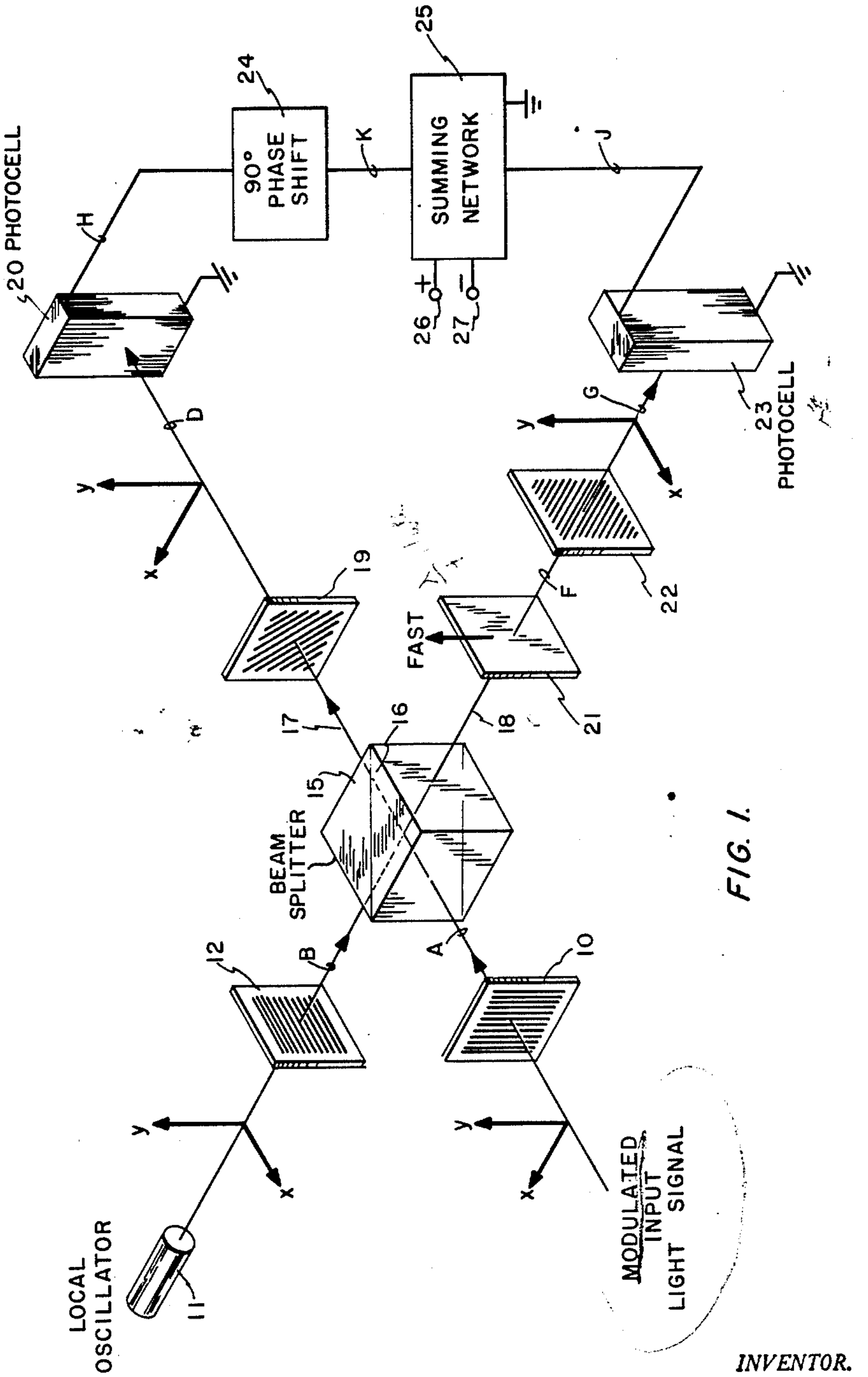
FIG. 1 is a schematic view of one embodiment of my invention.
Figure 3:
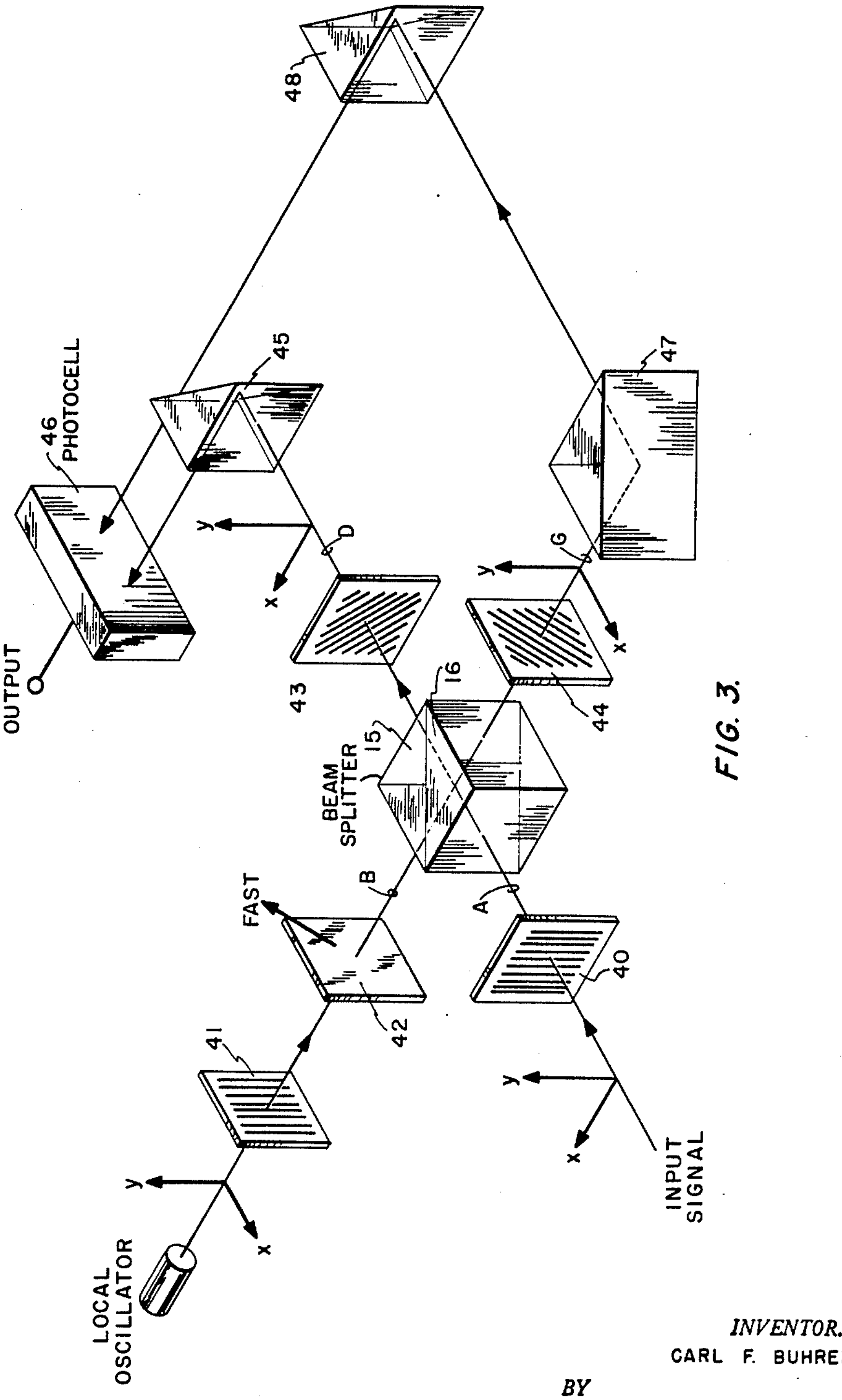
FIG. 3 is another embodiment of my invention.

Referring to FIG. 1, there is shown an optical superheterodyne receiver in which a single-sideband suppressed-carrier input light signal is plane polarized in the vertical, or $y$, direction by a plane polarizer 10. The direction of polarization of polarizer 10, as well as the other polarizers in FIGS. 1 and 3, is indicated by parallel lines extending in the direction of polarization. The direction of polarization of a light beam or signal is defined as the angle between this direction and the $y$ axis in a plane transverse to the direction of propagation of the beam or signal.

A local oscillator light signal is generated at the frequency of the suppressed carrier by a coherent light source 11 such as an optical maser of the type described in copending application Serial No. 200,239 filed June 5, 1962 by Kenneth D. Earley et al. The oscillator signal is plane polarized in the horizontal, or $x$, direction by a plane polarizer 12.

The plane polarized beams at A and B are combined in a beam splitter 15 which includes a partially silvered mirror 16 arranged to transmit part of the incident light and reflect part. A first composite light beam 17 is formed by beam splitter 15, this composite beam comprising a first component transmitted through the beam splitter by the input beam and a second component consisting of light from the oscillator beam reflected by mirror 16. Similarly, a second composite beam 18 is formed by beam splitter 15, this second composite beam consisting of a first component formed from the light transmitted through the beam splitter by the oscillator beam and a second component reflected in mirror 16 from the input beam. The first composite beam 17 is plane polarized at an angle of 45° from the $y$ axis by plane polarizer 19 and illuminates the surface of a photocell 20. The second composite beam is passed through a quarterwave plate 21 having its "fast" direction in the vertical direction. (The "fast" direction of plate 21 is the direction of polarization for which the beam velocity is a maximum while for the polarization perpendicular to this, the "slow" direction, the velocity of the beam is a minimum.) The beam is then plane polarized at 45° to the $y$ axis by plane polarizer 22 and illuminates photocell 23.

Plane polarizers 10, 12, 19 and 22 are made of any material capable of polarizing light such as Polaroid. The quarter-wave plate 21 consists of a thin sheet of split mica, or quartz, cut parallel to its optic axes and having a thickness which produces a 90° relative phase shift between light component in the $x$ and $y$ directions. Photocells 20 and 23 are of the photoemissive type and produce an output voltage across a load impedance which is substantially proportional to the square of the light impedance; i.e. proportional to the intensity of the illumination on the surface. The output of photocell 20 is electrically coupled through a 90° wideband phase shifting network 24 to the first input of an algebraic summing network 25 and the output of photocell 23 is electrically connected to the second input of summing network 25. Summing network 25 produces a first output voltage at terminal 26 proportional to the algebraic sum of the voltages applied to the first and second input and a second output voltage at terminal 27 proportional to the difference between these voltages.

The operation of the optical receiver of FIG. 1 is as follows:

Assume that the input light incident on plane polarizer 10 is a single-sideband suppressed-carrier signal having modulating signals with angular frequencies $p$ and $q$, the suppressed carrier having a frequency $w_c$. The light reaching point A may be expressed by the equations $$E_{Ax}=0$$

$$E_{Ay}=P\cos(w_c+p)t+Q\cos(w_c-q)t$$

where $E_{Ax}$ and $E_{Ay}$ are the light components polarized in the $x$ and $y$ directions respectively at point A, P and Q are the amplitudes at point A of the upper sideband $w_c+p$ and the lower sideband $w_c-q$ respectively, and $t$ is time.

The plane polarized light reaching point B may be similarly expressed as $$E_{Bx}=E_c\cos(w_c+\delta)$$

$$E_{By}=0$$

where $E_c$ is the amplitude of the coherent oscillator signal at point B and $\delta$ is an arbitrary phase angle between the oscillator output and the suppressed carrier.

It shall be noted that the $+x$ direction is to the right for a viewer at point A observing the light approaching him while, for a viewer at point B, the $+x$ direction is to the left. This rotation is consistent with the reflection produced by mirror 16 which effectively rotates the $+x$ direction 180° as shown by the axes at points D and $G$.

Figure 2:
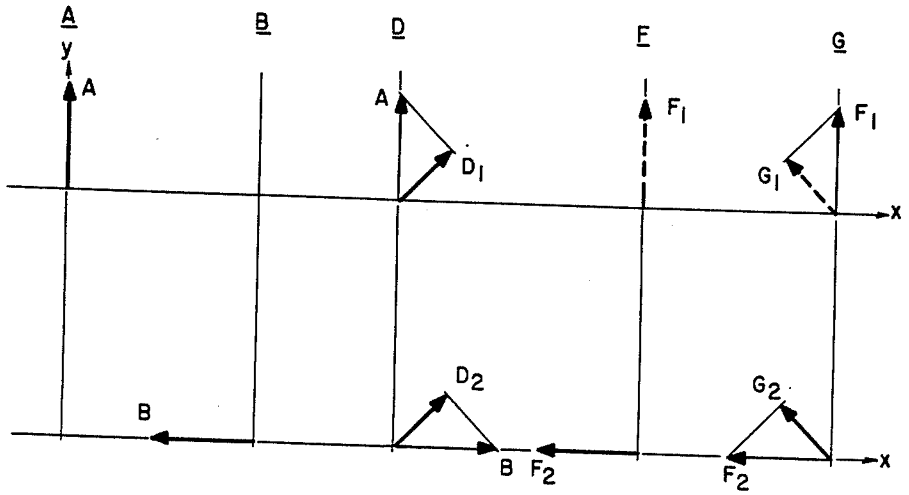
FIG. 2 shows vector diagrams useful in explaining the operation of the optical receiver of FIG. 1.

FIG. 2 shows the directions of polarization of the input and oscillator beams at points A and B respectively as the beam approaches the viewer. Although the amplitude of the input signal is much smaller than that of the oscillator signal, the vectors depicting the directions of polarization of the two signals have been given the same length for clarity.

The plane polarized light at point A is transmitted through the partially silvered mirror 16 and is combined with light from point B reflected by the mirror to form the first composite beam 17. This composite beam is plane polarized at 45° by polarizer 19 producing a first component $D_1$ (FIG. 2) equal in amplitude to the projection in the 45° plane of the vertically polarized light at point A. A second component $D_2$ is produced equal to the projection of the horizontally polarized light at point B in the 45° plane. The composite light beam at point D may be expressed as $$E_D=1/\sqrt{2}\ (E_{Ay}+E_{Bx})$$

$$=1/\sqrt{2}[P\cos(w_c+p)t+Q\cos(w_c-q)t+E_c\cos(w_ct+\delta)]$$

Similarly, the plane polarized light at point B is transmitted through the partially silvered mirror 16 and combined with light reflected by the mirror to form the second composite beam 18. This beam is passed through quarter-wave plate 21 which is oriented so that vertically polarized light is transmitted at a greater velocity than horizontally polarized light. Further, plate 21 is of such thickness that, upon emerging, the vertically polarized light at point F leads the horizontally polarized light by a quarter-wavelength at the oscillator frequency. This is indicated in FIG. 2 by the dashed vertical vector $F_1$ and the solid horizontal vector $F_2$, the direction of the vectors indicating the polarization directions of the light components and the representation of vector $F_1$ by dashes indicating that $F_1$ leads $F_2$ by 90° in time. Thus, the light at point F may be expressed as $$E_{Fx}=E_c \cos (w_c t+\delta)$$
$$E_{Fy}=-P \sin (w_c+p)t-Q \sin (w_c-q)t$$

The beam is next polarized at 45° to the $y$ axis by plane polarizer 22 producing the components $G_1$ and $G_2$ at point G. As shown in FIG. 2, $G_1$ and $G_2$ are displaced 90° in time phase. The composite light beam at point G is therefore $$E_G=1/\sqrt{2}[E_{Fy}+E_{Fx}]$$
$$=1/\sqrt{2}[-P \sin (w_c+p)t -Q \sin (w_c-q)t+E_c \cos (w_c t+\delta)]$$

The voltages at the output of photocells 20 and 23 are proportional to the average of the square of the amplitude of illumination of the first and second composite beams at points D and G respectively. The sideband amplitudes P and Q are relatively small compared to the amplitude of the local oscillator signal $E_c$ and therefore all terms containing $P^2$, $Q^2$ or PQ may be neglected. Also photocells 20 and 23 will not respond to components at twice the carrier frequency and therefore these terms are assumed to be zero. As a result the voltage at point H is $$V_H=E_c^2/4+E_c/\sqrt{2}[P \cos (pt-\delta)+Q \cos (qt+\delta)]$$

and the voltage at point J is $$V_J=E_c^2/4+E_c/\sqrt{2}[-P \sin (pt-\delta)+Q \sin (qt+\delta)]$$

$V_H$ is shifted 90° by phase shifter 24 resulting in $$V_K=E_c^2/4+E_c/\sqrt{2}[P \sin (pt-\delta)+Q \sin (qt+\delta)]$$

Adding $V_K$ and $V_J$ in summing network 25 produces an output at terminal 26 having an angular frequency equal to the lower sideband modulation frequency $q$. Subtracting $V_K$ from $V_J$ produces an output at terminal 27 having an angular frequency equal to the upper sideband modulation frequency $p$. Also, if a single sideband frequency is received simultaneously with a spurious image signal, the desired signal appears at one output terminal and the image signal at the other.

In FIG. 1, polarizer 10 has been shown oriented in the vertical direction and polarizer 12 in the horizontal direction. However, it should be understood that the polarizer 10 could, for example, be rotated clockwise by $\theta$ degrees (where $\theta$ is an angle viewed from point A), polarizer 12 counterclockwise by $\theta$ degrees (viewed from point B), and polarizer 19 clockwise by $\theta$ degrees (viewed from point D) without changing the operation of the receiver. Similarly, either plane polarizer 10, plane polarizer 12, or both, may be replaced by circular polarizers of the proper orientation provided suitable changes in the orientations of plane polarizers 19, 21, and 22 are also made. Many other orientations are possible, as will be appreciated by those skilled in the art, which will result in the instantaneous phase angle between the first and second components of one of the composite beams differing by 90° from the instantaneous phase angle between the first and second components of the other composite beam. That is, referring to FIG. 2, the orientations and positions of the polarizers and quarter-wave plates are selected so that the component $D_1$ is in time phase with $D_2$ at point D when the component $G_1$ is 90° out of time phase with $G_2$ at point G.

Figure 4:
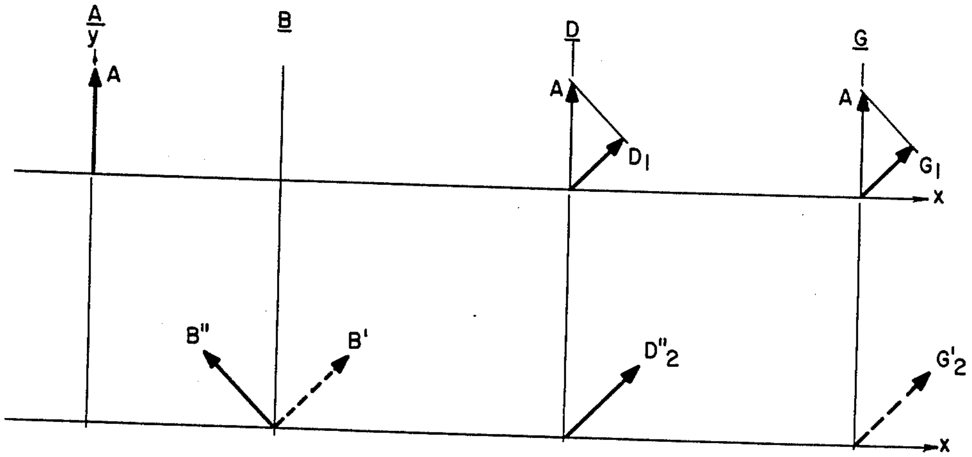
FIG. 4 depicts vector diagrams which help to explain the operation of the receiver of FIG. 3.

In FIG. 3, there is shown another embodiment of my invention in which both composite beams strike a single photocell thereby producing a single output voltage having a frequency equal to one of the sideband modulation frequencies. In this embodiment, the input signal is plane polarized in the $y$ direction by a plane polarizer 40 and the oscillator signal is left-circularly polarized by the plane polarizer 41 and a quarter-wave plate 42. The polarization of the light at point A is shown in FIG. 4 as a vertical vector. The circularly polarized light at point B is composed of two components in space quadrature B′ and B″ where B′ leads B″ by 90° in time phase. This is shown in FIG. 4, vector B′ being shown dashed and vector B″ being shown solid to indicate the time relationship between them.

Plane polarizer 43 polarizes the composite beam formed by the input and the oscillator beam at 45° to the $x$ axis as shown at D in FIG. 4. The vector $D_1$ is the component of light vector A in the 45° direction. Vector $D_2''$ is the reflection of the B″ vector, B′ being eliminated by polarizer 43 since it is at right angle to the direction of polarization. Similarly, plane polarizer 44 polarizes the light reflected by mirror 16 and transmits the "fast" component of the left-circularly polarized light at point B as indicated at G in FIG. 4. Thus, comparison of G and D in FIG. 4 indicates that the first and second components of the composite beam at D are in time phase when the first and second components at G are 90° out of time phase.

The light at point D is reflected by a mirror 45 to the photocell 46. Similarly, the light at point G is reflected by mirrors 47 and 48 to photocell 46. The two optical paths between beam splitter 15 and photocell 46 differ such that the average light transit times between these points differs by an odd number of quarter cycles of the modulating frequency. Thus, the 90° phase shift at the intermediate frequency, which was obtained in the embodiment of FIG. 1 by phase shifter 24, is realized in FIG. 3 by adjustment of the lengths of the paths of the first and second composite beams. Since mixing takes place in the single photocell 46, only one sideband is received, the image frequency being suppressed as a result of the phase shift at the modulation frequency. The other sideband can be produced by rotating quarter-wave plate 42 through 90° changing the light at point B from left-circular to right-circularly polarized thereby changing the phase of the light component at points D and G.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:

1. An optical receiver for producing an output signal having an intermediate frequency equal to the difference between the frequencies of first and second polarized signals comprising (a) means for combining said first and second polarized signals into first and second composite signals, each of said composite signals having first and second components corresponding to said first and second polarized signals respectively, (b) phase shifting means for producing a predetermined angular phase difference (in time) between the first and second components of said second composite signal, the instantaneous angular phase difference between the first and second components of said second composite signal differing by 90° from the instantaneous angular phase difference between the first and second components of said first composite signal, and (c) photodetector means, said photodetector means receiving said first and second composite signals and producing said output signal.

2. An optical receiver for producing an output signal having an intermediate frequency equal to the difference between the frequencies of first and second polarized light beams comprising (a) combining means for combining said first and second polarized light beams into first and second composite light signals directed along first and second light paths respectively, each of said composite light signals having first and second components corresponding to said first and second polarized light beams respectively, (b) phase shifting means for producing a predetermined phase difference between the first and second components of said second composite signal, the instantaneous phase angle between the first and second components of said second composite signal differing by 90° from the instantaneous phase angle between the first and second components of said first composite signal, and (c) photodetector means, said photodetector means receiving said first and second composite signals and producing said output signal, the lengths of said first and second light paths being such that the intervals of time required for said first and second composite beams to travel between said combining means and said photodetector means differ by an odd number of quarter cycles of said intermediate frequency.

3. An optical receive for producing an output signal having an intermediate frequency equal to the difference between the frequencies of first and second polarized light beams comprising (a) means for combining said first and second polarized light beams into first and second composite light signals directed along first and second paths respectively, each of said composite light signals having first and second components corresponding to said first and second polarized light beams respectively, (b) phase shifting means for producing a predetermined phase difference between the first and second components of said second composite signal, the instantaneous phase angle between the first and second components of said second composite signal differing by 90° from the instantaneous phase angle between the first and second components of said first composite signal, (c) first and second photodetector means for receiving said first and second composite light signals respectively, the lengths of said first and second light paths being such that the intervals of time required for said first and second composite light signal to travel between said combining means and said photodetector means differ by an odd number of quarter-cycles of said intermediate frequency, and (d) summing means having a first input coupled to said first photodetector means and a second input coupled to the output of said second photodetector means, said summing means producing a first output proportional to the sum of the signals applied to said first and second inputs and a second output proportional to the difference between the signals applied to said first and second inputs.

4. An optical receiver for producing an output signal having an intermediate frequency equal to the difference between the frequencies of first and second polarized light beams comprising (a) means for combining said first and second polarized light beams into first and second composite light signals directed along first and second paths respectively, each of said composite light signals having first and second components corresponding to said first and second polarized light beams respectively, (b) first phase shifting means for producing a predetermined phase difference between the first and second components of said second composite signal, the instantaneous phase angle between the first and second components of said second composite signal differing by 90° from the instantaneous phase angle between the first and second components of said first composite signal, (c) first and second photodetector means for receiving said first and second composite light signals respectively, (d) second phase shifting means coupled to the output of said first photodetector means, said phase shifting means shifting the phase of the output of said first photodetector means 90° at the intermediate frequency relative to the output of said second photodetector means, and (e) summing means having a first input coupled to said second phase shifting means and a second input coupled to the output of said second photodetector means, said summing means producing a first output proportional to the sum of the signals applied to said first and second inputs and a second output proportional to the difference between the signals applied to said first and second inputs.

5. An optical receiver for producing an output signal having an intermediate frequency equal to the difference between the frequencies of first and second applied light beams comprising (a) first and second polarizing means located in the paths of said first and second applied light beams respectively, said first and second polarizing means polarizing said first and second beams in predetermined directions, (b) means for combining said first and second polarized light beams into first and second composite light signals directed along first and second paths respectively, each of said composite light signals having first and second components corresponding to said first and second polarized light beams respectively, (c) phase shifting means for producing a predetermined angular phase difference between (in time) the first and second components of said second composite light signal, the instantaneous phase angle between the first and second components of said second composite signal differing by 90° from the instantaneous phase angle between the first and second component of said first composite signal, and (d) photodetector means, said photodetector means receiving said first and second composite signals and producing said output signal.

6. An optical receiver as defined by claim 5, wherein said first and second polarizing means are plane polarizers, the angular difference between the directions of polarization of said first and second polarizing means being 90°.

7. An optical receiver for producing an output signal having an intermediate frequency equal to the difference between the frequencies of first and second applied light beams comprising (a) first and second plane polarizing means located in the paths of said first and second applied light beams respectively, the angular difference between the directions of polarization of said first and second polarizing means being 90°, (b) means for combining said first and second polarized light beams into first and second composite light signals directed along first and second paths respectively, each of said composite light signals having first and second components corresponding to said first and second polarized light beams respectively, (c) optical means for producing a 90° phase shift in light having a first direction of polarization with respect to light having a second degree of polarization, said optical means being located in the path of said second composite light signal, (d) third and fourth plane polarizing means located in the paths of said first and second composite light signals respectively, the angular difference between the directions of polarization of said first and second polarizing means being between 0° and 90°, (e) first and second photodetector means for receiving light transmitted through said third and fourth plane polarizing means respectively, said first and second photodetector means each producing an output voltage proportional to the square of the amplitude of the light incident thereon, (f) phase shifting means coupled to the output of said first photodetector means, said phase shifting means shifting the phase of the output of said first photodetector means 90° at the intermediate frequency relative to the output of said second photodetector means, and (g) summing means having a first input coupled to said phase shifting means and a second input coupled to the output of said second photodetector means, said summing means producing a first output proportional to the sum of the signals applied to said first and second inputs and a second output proportional to the difference between the signals applied to said first and second inputs.

8. An optical receiver as defined in claim 7, wherein said optical means is a quarter-wave plate having mutually perpendicular "fast" and "slow" directions, the light polarized in said "fast" direction leading the light polarized in said "slow" direction by 90°.

9. An optical receiver for receiving a polarized suppressed-carrier single-sideband input light beam having upper and lower information carrying sidebands comprising (a) means for generating a polarized coherent local oscillator light beam at the frequency of the suppressed carrier of said input light signal, (b) means for combining said input and local oscillator beams into first and second composite light signals directed along first and second paths, each of said composite light signals having first and second components corresponding to said polarized input and local oscillator beams respectively, (c) optical means for producing a 90° phase shift in light having a first direction of polarization with respect to light having a second degree of polarization, said optical means being located in the path of said second composite light signal, (d) third and fourth plane polarizing means located in the paths of said first and second composite light signals respectively, the angular difference between the directions of polarization of said first and second polarizing means being between 0° and 90°, (e) first and second photodetector means for receiving light transmitted through said third and fourth plane polarizing means respectively, said first and second photodetector means each producing an output voltage proportional to the square of the amplitude of the light incident thereon, (f) phase shifting means coupled to the output of said first photodetector means, said phase shifting means shifting the phase of the output voltage of said first photodetector means 90° at frequencies equal to the difference between each of said sideband frequencies and the frequency of the local oscillator, and (g) summing means having a first input coupled to said phase shifting means and a second input coupled to the output of said second photoconductor means, said summing means producing a first output voltage having a frequency equal to the difference between the frequency of said upper sideband and the frequency of said local oscillator and a second output voltage having a frequency equal to the difference between the frequency of said lower sideband and the frequency of said local oscillator.

10. An optical receiver for receiving a suppressed-carrier single-sideband input light beam having upper and lower sidebands comprising (a) means for generating a coherent local oscillator light beam at the frequency of the suppressed carrier of said input light signal, (b) first and second polarizing means for polarizing said input beam and said local oscillator beams respectively, one of said beams being plane polarized and the other being circularly polarized, (c) means for combining said input and local oscillator beams into first and second composite light signals directed along first and second paths, each of said composite light signals having first and second components corresponding to said polarized input and local oscillator beams respectively, (d) third and fourth plane polarizing means located in the paths of said first and second composite light signals respectively, the angular difference between the directions of polarization of said third and fourth polarizing means being 90° and the angular difference between the directions of polarization of said third and fourth polarizing means and the direction of polarization of said first polarizing means being 45°, and (e) a photodetector for receiving light transmitted through third and fourth plane polarizing means respectively and producing an output voltage having an intermediate frequency equal to the difference between one of said sidebands and the frequency of said local oscillator, the length of said first and second light paths being such that the intervals of time required for said first and second composite beams to travel between said combining means and said photodetector differ by an odd integral multiple of quarter-cycles of said intermediate frequency.

11. An optical receiver as defined by claim 10, wherein said means for polarizing said input beam is a plane polarizer and said means for polarizing said local oscillator beam is a circular polarizer.

12. The method of receiving a selected single sideband from a light beam having upper and lower sidebands comprising the steps of (a) polarizing said input light beam, (b) combining said polarized input light beam with a polarized coherent local oscillator light beam to form first and second composite light signals each having first and second components corresponding to said input and local oscillator light beams, (c) shifting the phase of the components comprising said first and second composite light signals so that the instantaneous phase angle between the first and second components of said second composite signal differs by 90° from the instantaneous phase angle between the first and second components of said first composite signal, (d) delaying said second composite light signal with respect to said first composite light signal by an interval of time corresponding to an odd number of quarter-cycles of an intermediate frequency equal to the difference between the frequency of said selected sideband and the frequency of said local oscillator light beam, (e) mixing the first and second components of said first composite light signal and mixing the first and second components of said second composite light signal, said mixing producing first and second electrical signals proportional to the intensity of the illumination provided by said first and second composite light signals, and (f) summing said first and second electrical signals to produce an output voltage having a frequency equal to said intermediate frequency.

13. The method of receiving a light signal having upper and lower sidebands comprising (a) polarizing said input light beam, (b) combining said polarizing input light beam with a polarized coherent local oscillator light beam to form first and second composite light signals each having first and second components corresponding to said input and local oscillator light beams, (c) shifting the phase of the components comprising said first and second composite light signals so that the instantaneous phase angle between the first and second components of said second composite signal differs by 90° from the instantaneous phase angle between the first and second components of said first composite signal, (d) mixing the first and second components of said first composite light signal and mixing the first and second components of said second composite light signal, said mixing producing first and second electrical signals proportional to the intensity of the illumination provided by said first and second composite light signals, (e) shifting the phase of said first electrical signal with respect to said second electrical signal by 90° at frequencies corresponding to the differences between the frequencies of said upper and lower sidebands and the frequency of said local oscillator light beam, (f) adding said phase shifted first electrical signal and said second electrical signal to produce a first output having a frequency equal to the frequency of one of said sidebands, and (g) obtaining the difference between said phase shifted first electrical signal and said second electrical signal to produce a second output having a frequency equal to the frequency of the other sideband.

References Cited by the Examiner

UNITED STATES PATENTS 2,531,951 11/50 Shamas et al. ---------- 250—199

OTHER REFERENCES

Oliver: Proc. I.R.E., Dec. 1961, pp. 1960, 1961.

DAVID G. REDINBAUGH, *Primary Examiner.*